(12) United States Patent
Shmidt

(10) Patent No.: US 12,015,368 B2
(45) Date of Patent: Jun. 18, 2024

(54) METHOD OF DETERMINING A POSITION OF A ROTOR OF A BRUSHLESS PERMANENT MAGNET MOTOR

(71) Applicant: Dyson Technology Limited, Wiltshire (GB)

(72) Inventor: Nikita Shmidt, Swindon (GB)

(73) Assignee: Dyson Technology Limited, Wiltshire (GB)

( * ) Notice: Subject to any disclaimer, the term of this patent is extended or adjusted under 35 U.S.C. 154(b) by 192 days.

(21) Appl. No.: 17/598,174

(22) PCT Filed: Mar. 19, 2020

(86) PCT No.: PCT/GB2020/050740
§ 371 (c)(1),
(2) Date: Sep. 24, 2021

(87) PCT Pub. No.: WO2020/193957
PCT Pub. Date: Oct. 1, 2020

(65) Prior Publication Data
US 2022/0352834 A1 Nov. 3, 2022

(30) Foreign Application Priority Data
Mar. 28, 2019 (GB) ...................................... 1904290

(51) Int. Cl.
*H02P 6/18* (2016.01)
*H02P 6/182* (2016.01)
(52) U.S. Cl.
CPC .................................. *H02P 6/182* (2013.01)
(58) Field of Classification Search
CPC .................................................... H02P 6/182
(Continued)

(56) References Cited

U.S. PATENT DOCUMENTS 5,600,218 A 2/1997 Holling et al.
5,635,810 A 6/1997 Goel
(Continued)

FOREIGN PATENT DOCUMENTS

CN 1306340 A 8/2001
CN 106026802 10/2016
(Continued)

OTHER PUBLICATIONS

GB Search Report Received for GB Application No. 1904290, mailed on Sep. 24, 2019, 1 page.
(Continued)

*Primary Examiner* — Erick D Glass
(74) *Attorney, Agent, or Firm* — Tucker Ellis LLP; Michael G. Craig

(57) ABSTRACT

A method of determining a position of a rotor of a brushless permanent magnet motor includes measuring phase current flowing through a phase winding of the motor during excitation of the phase winding, and measuring voltage applied to the phase winding of the motor during excitation of the phase winding. The method includes calculating a phase of back EMF induced in the phase winding using the measured phase current and the measured voltage. The method includes determining a zero-crossing point of the back EMF induced in the phase winding using the calculated phase of back EMF induced in the phase winding. The method includes determining an aligned position of the rotor of the brushless permanent magnet motor when the back EMF induced in the phase winding is at the zero-crossing point.

20 Claims, 5 Drawing Sheets

(58) Field of Classification Search
USPC .................................................. 318/400.34
See application file for complete search history.

(56) References Cited

U.S. PATENT DOCUMENTS

| | | |
|---|---|---|
| 5,696,430 A | 12/1997 | Erdman et al. |
| 6,005,364 A | 12/1999 | Acarnley |
| 6,034,493 A | 3/2000 | Boyd et al. |
| 6,448,725 B1 | 9/2002 | Cho et al. |
| 6,462,491 B1 | 10/2002 | Iijima et al. |
| 6,853,163 B2 | 2/2005 | Slater |
| 6,864,658 B1 | 3/2005 | Torrey et al. |
| 6,979,974 B2 | 12/2005 | Slater et al. |
| 6,996,482 B2 | 2/2006 | Kunz et al. |
| 8,212,508 B2 | 7/2012 | Paintz et al. |
| 8,624,532 B2 | 1/2014 | Chuah et al. |
| 9,525,372 B2 * | 12/2016 | Hill .................. H02P 6/186 |
| 9,557,351 B2 | 1/2017 | Singh |
| 9,831,809 B1 | 11/2017 | Takai |
| 11,476,783 B1 * | 10/2022 | Mahankali ............ H02P 6/182 |
| 2013/0043814 A1 | 2/2013 | Chuah et al. |
| 2013/0234631 A1 | 9/2013 | Bateman |
| 2013/0234633 A1 * | 9/2013 | Bateman .................. H02P 6/18 318/400.06 |
| 2013/0234640 A1 * | 9/2013 | Bateman ................ H02P 6/182 318/400.35 |
| 2017/0170759 A1 | 6/2017 | Fitzpatrick et al. |
| 2018/0062549 A1 | 3/2018 | Murray et al. |

FOREIGN PATENT DOCUMENTS

| | | |
|---|---|---|
| CN | 106026804 | 10/2016 |
| CN | 106026805 | 10/2016 |
| CN | 106059435 | 10/2016 |
| CN | 205647313 | 10/2016 |
| CN | 106160596 | 11/2016 |
| CN | 106160602 | 11/2016 |
| FR | 2807234 | 10/2001 |
| GB | 201203911 | 4/2012 |
| JP | 07-245982 A | 9/1995 |
| JP | 2018-038213 | 3/2018 |
| KR | 10-2006-0068845 A | 6/2006 |
| WO | 2013/132249 A1 | 9/2013 |

OTHER PUBLICATIONS

International Search Report and Written Opinion received for PCT Patent Application No. PCT/GB2020/050740, mailed on Jun. 19, 2020, 11 pages.
Office Action received for Japanese Patent Application No. 2021-557536, mailed on Nov. 21, 2022, 7 pages (4 pages of English Translation and 3 pages of Original Document).
Office Action received for Chinese Patent Application No. 202080024953.5, mailed on Nov. 17, 2023, 13 pages (7 pages of English Translation and 6 pages of Original Document).
Office Action received for European Patent Application No. 20716537.4, mailed on Nov. 27, 2023, 7 pages.
Xiaoming et al., Rotor Position Detection of Brushless DC Motor Controlled by Optimal PWM, Electrical automation, 01, Feb. 15, 2009.

* cited by examiner

| Control Signals | | | | Power Switches | | | | Inverter Condition |
|---|---|---|---|---|---|---|---|---|
| S1 | S2 | S3 | S4 | Q1 | Q2 | Q3 | Q4 | |
| 0 | 0 | 0 | 0 | 0 | 0 | 0 | 0 | Off |
| 1 | 0 | 0 | 1 | 1 | 0 | 0 | 1 | Excite Left-to-Right |
| 0 | 1 | 1 | 0 | 0 | 1 | 1 | 0 | Excite Right-to-Left |
| 0 | 1 | 0 | 1 | 0 | 1 | 0 | 1 | Body Freewheel |
| 0 | 0 | 0 | 1 | 0 | 0 | 0 | 1 | Diode Freewheel Left-to Right |
| 0 | 1 | 0 | 0 | 0 | 1 | 0 | 0 | Diode Freewheel Right-to-Left |

Fig. 3

METHOD OF DETERMINING A POSITION OF A ROTOR OF A BRUSHLESS PERMANENT MAGNET MOTOR

CROSS-REFERENCE TO PRIOR APPLICATION

This application is a § 371 National Stage Application of PCT International Application No. PCT/GB2020/050740 filed Mar. 19, 2020, which claims the priority of United Kingdom Application No. 1904290.2, filed Mar. 28, 2019, each of which are herein incorporated by reference in their entirety.

FIELD OF THE INVENTION

The present invention relates to a method of determining the position of a rotor of a brushless permanent magnet motor.

BACKGROUND OF THE INVENTION

Knowledge of rotor position is essential in order to commutate phase windings of a brushless permanent magnet motor at the correct times. A brushless permanent-magnet motor will often include a Hall-effect sensor, which outputs a signal indicative of the rotor position. Although the component cost of the sensor is relatively cheap, integrating the sensor within the motor often complicates the design and manufacture of the motor. Additionally, the signal output by the sensor is often susceptible to electromagnetic noise generated within the motor.

Sensorless schemes for determining indirectly a position of a rotor are known. For a permanent-magnet motor, transitions in the polarity of the back EMF induced in a phase winding may be used to determine the rotor position. For a multi-phase motor, the rotor position may be determined by sensing the back EMF induced in a non-excited phase winding. For a single-phase motor, the lack of additional phase windings makes this type of control unfeasible. Nevertheless, a position of the rotor may be determined by suspending excitation at points in the electrical cycle where transitions in the polarity of the back EMF are expected. Unfortunately, suspending excitation has the disadvantage of reducing the electrical power that can be driven into the motor.

A sensorless scheme which mitigates the above-mentioned disadvantages has previously been proposed in PCT patent application WO2013/132249. Whilst this scheme may go some way toward mitigating the above-mentioned disadvantages, the scheme disclosed therein utilizes a complex hardware arrangement which may add to the overall cost of the control system of the motor.

SUMMARY OF THE INVENTION

According to a first aspect of the present invention there is provided a method of determining a position of a rotor of a brushless permanent magnet motor, the method comprising measuring phase current flowing through a phase winding of the motor during excitation of the phase winding, measuring voltage applied to the phase winding of the motor during excitation of the phase winding, calculating a phase of back EMF induced in the phase winding using the measured phase current and the measured voltage, determining a zero-crossing point of the back EMF induced in the phase winding using the calculated phase of back EMF induced in the phase winding, and determining an aligned position of the rotor of the brushless permanent magnet motor when the back EMF induced in the phase winding is at the zero-crossing point.

The method according to the first aspect of the present invention may be advantageous principally as the method comprises calculating a phase of back EMF induced in the phase winding using the measured phase current and the measured voltage, determining a zero-crossing point of the back EMF induced in the phase winding using the calculated phase of back EMF induced in the phase winding, and determining an aligned position of the rotor of the brushless permanent magnet motor when the back EMF induced in the phase winding is at the zero-crossing point.

In particular, it is known that the back EMF of a brushless permanent magnet motor may have a substantially sinusoidal form, and it may be possible to obtain an amplitude and a frequency of back EMF induced in the phase winding from past measurement or simulation, or from real-time calculation. By calculating a phase of back EMF induced in the phase winding using the measured instantaneous phase current and the measured voltage, this information can then be used in conjunction with the known amplitude and frequency to provide a relatively accurate representation of a waveform of the back EMF induced in the phase winding. The representation of a waveform of the back EMF induced in the phase winding may then be used to determine a zero-crossing point of the back EMF induced in the phase winding, and hence to determine an aligned position of the rotor when the back EMF induced in the phase winding is at the zero-crossing point.

The method according to the first aspect of the present invention may also be advantageous as the method may enable zero-crossing points to be determined where they lie outside of periods of excitation of the phase winding. In particular, by utilizing a representation of the back EMF induced in the phase winding in the manner described above, zero-crossing points can be determined irrespective of whether or not they lie within a period of excitation of the phase winding. This may enable efficient operation over a wider range of powers relative to, for example an arrangement where the rotor position is determined by hardware. In particular, a motor in which zero-crossing points can only be determined during periods of excitation may have a lower operating efficiency for a given power relative to a motor which is controlled in accordance with the method according to the first aspect of the present invention, as zero-crossing points which lie outside periods of excitation cannot be determined with any accuracy, leading to inefficient commutation.

The method may be carried out using software, for example rather than using hardware. Hence component number and/or overall cost of a control system to implement the method according to the first aspect of the present invention may be reduced, for example relative to a scheme where zero-crossings of back EMF are predicted or calculated using hardware.

By a zero-crossing point of back EMF induced in the phase winding is meant a point at which the value of the back EMF hits zero during a transition between a positive polarity back EMF value and a negative polarity back EMF value, or vice versa.

A phase of back EMF induced in the phase winding may be calculated using the equation $$E = L\frac{dI}{dt} + IR - V_{PH},$$

where E is the back EMF induced in the phase winding, L is the inductance of the phase winding, I is the phase current flowing through the phase winding, R is the resistance of the phase winding, and $V_{PH}$ is the voltage across the phase winding.

The method may comprise measuring phase current over a plurality of excitation pulses applied to the phase winding, for example over each excitation pulse applied to the phase winding, or over every other excitation pulse applied to the phase winding. Measuring phase current over each excitation pulse applied to the phase winding may be beneficial as it may improve the accuracy of the determined zero-crossing point. The method may comprise measuring phase current at the beginning of each excitation pulse applied to the phase winding, and at the end of each excitation pulse applied to the phase winding. The method may comprise measuring phase current for substantially the full duration of each excitation pulse applied to the phase winding.

Measuring current flowing through the phase winding of the motor may comprise measuring average phase current flowing through the phase winding of the motor and/or measuring instantaneous phase current flowing through the phase winding of the motor.

Measuring voltage applied to the phase winding of the motor during excitation of the phase winding may comprise measuring average DC voltage and/or measuring instantaneous DC voltage applied to the phase winding of the motor during excitation of the phase winding.

The method may comprise commutating the phase winding relative to the determined zero-crossing point of back EMF induced in the phase winding. For example, the method may comprise advancing commutation of the phase winding relative to the determined zero-crossing point, and/or the method may comprise commutating the phase winding synchronously with the determined zero-crossing point, and/or the method may comprise retarding commutation of the phase winding relative to the determined zero-crossing point.

Determining an aligned position of the rotor of the brushless permanent magnet motor when the back EMF induced in the phase winding is at the zero-crossing point may comprise determining a future aligned position of the rotor when the back EMF is at a future zero-crossing point. For example, determining a zero-crossing point of the back EMF induced in the phase winding using the calculated phase of back EMF induced in the phase winding may comprise determining a future zero-crossing point of the back EMF induced in the phase winding.

The back EMF induced in the phase winding may comprise a sinusoidal waveform, for example having an amplitude and a frequency. Determining a zero-crossing point of the back EMF induced in the phase winding may comprise utilizing any or any combination of a calculated phase of back EMF induced in the phase winding, an amplitude representative of the amplitude of back EMF induced in the phase winding, and a frequency representative of the frequency of back EMF induced in the phase winding.

An amplitude representative of the amplitude of back EMF induced in the phase winding may comprise a pre-determined amplitude, and/or a frequency representative of the frequency of back EMF induced in the phase winding may comprise a pre-determined frequency. For example, a pre-determined amplitude and/or a pre-determined frequency may be obtained by prior measurement or simulation, and may be stored in memory of a controller of the brushless permanent magnet motor. An amplitude representative of the amplitude of back EMF induced in the phase winding may comprise a calculated amplitude, for example calculated in real time, and/or a frequency representative of the frequency of back EMF induced in the phase winding may comprise a calculated frequency, for example calculated in real time. The amplitude representative of the amplitude of back EMF induced in the phase winding, and/or the frequency representative of the frequency of back EMF induced in the phase winding may be speed-dependent. For example, a higher speed of rotation of the rotor of the brushless permanent magnet motor may result in a larger amplitude and/or frequency.

Calculating a phase of back EMF induced in the phase winding may comprise integrating the equation $$E = L\frac{dI}{dt} + IR - V_{PH}$$

to obtain a relationship representative of integrated back EMF, for example a relationship between integrated back EMF, integrated and/or instantaneous phase current flowing through the phase winding, and integrated voltage applied to the phase winding. Integrating the equation $$E = L\frac{dI}{dt} + IR - V_{PH}$$

may comprise integrating the equations between boundaries set by the phase angle at the beginning and end of an excitation pulse applied to the phase winding.

Calculating a phase of back EMF induced in the phase winding may comprise equating the integrated back EMF to an integral of a sinusoidal waveform representative of back EMF induced in the phase winding. Calculating a phase of back EMF induced in the phase winding may comprise equating a relationship representative of integrated back EMF with an integral of a sinusoidal waveform representative of back EMF induced in the phase winding.

Calculating a phase of back EMF induced in the phase winding may comprise calculating at least one instantaneous back EMF value using the measured instantaneous phase current and the measured voltage. Calculating a phase of back EMF induced in the phase winding may comprise calculating at least one instantaneous back EMF value using any, or any combination of, a voltage across the phase winding, a DC supply voltage of the motor, an inductance of the phase winding, and a resistance of the phase winding. Calculating a phase of back EMF induced in the phase winding may comprise calculating an instantaneous back EMF value for substantially every value of measured instantaneous phase current.

Instantaneous back EMF values may be calculated using the equation $$E = L\frac{dI}{dt} + IR - V_{PH},$$

where E is the back EMF induced in the phase winding, L is the inductance of the phase winding, I is instantaneous phase current flowing through the phase winding, R is the resistance of the phase winding, and $V_{PH}$ is the voltage across the phase winding. The inductance of the phase winding may comprise the self-inductance of the phase winding and the mutual inductance of the phase winding, for example the difference between the self-inductance of the phase winding and the mutual inductance of the phase winding.

Calculating at least one instantaneous back EMF value using the measured instantaneous phase current may comprise calculating instantaneous back EMF values over a plurality of excitation pulses applied to the phase winding, for example over each excitation pulse applied to the phase winding. Calculating at least one instantaneous back EMF value using the measured instantaneous phase current may comprise calculating instantaneous back EMF values at the beginning of each excitation pulse applied to the phase winding, and at the end of each excitation pulse applied to the phase winding.

Calculating a phase of back EMF induced in the phase winding may comprise integrating calculated instantaneous back EMF values, for example integrating calculated instantaneous back EMF values between boundaries set by the phase angle at the beginning and end of an excitation pulse applied to the phase winding. This may be beneficial as it may enable calculation of the phase of the back EMF induced in the winding, whilst also filtering any noise that may be introduced during calculation of the instantaneous back EMF values using the measured instantaneous phase current, for example noise introduced via differentiation.

The method may comprise normalizing integrated calculated instantaneous back EMF values.

According to a second aspect of the present invention there is provided a brushless permanent magnet motor comprising a controller configured to measure instantaneous phase current flowing through a phase winding of the motor during excitation of the phase winding, measure voltage applied to the phase winding of the motor during excitation of the phase winding, calculate a phase of back EMF induced in the phase winding using the measured instantaneous phase current and the measured voltage, determine a zero-crossing point of the back EMF induced in the phase winding using the calculated phase of back EMF induced in the phase winding, and determine an aligned position of the rotor of the brushless permanent magnet motor when the back EMF induced in the phase winding is at the zero-crossing point.

According to a third aspect of the present invention there is provided a data carrier comprising machine readable instructions for the operation of a controller of a brushless permanent magnet motor to measure instantaneous phase current flowing through a phase winding of the motor during excitation of the phase winding, measure voltage applied to the phase winding of the motor during excitation of the phase winding, calculate a phase of back EMF induced in the phase winding using the measured instantaneous phase current and the measured voltage, determine a zero-crossing point of the back EMF induced in the phase winding using the calculated phase of back EMF induced in the phase winding, and determine an aligned position of the rotor of the brushless permanent magnet motor when the back EMF induced in the phase winding is at the zero-crossing point.

Preferential features of aspects of the present invention may be equally applied to other aspects of the present invention, where appropriate.

BRIEF DESCRIPTION OF THE DRAWINGS

In order to better understand the present invention, and to show more clearly how the invention may be put into effect, the invention will now be described, by way of example, with reference to the following drawings:

FIG. 3 details allowed states of an inverter of the motor system of FIG. 1 in response to control signals issued by a controller of the motor system;

DETAILED DESCRIPTION

Figure 1:
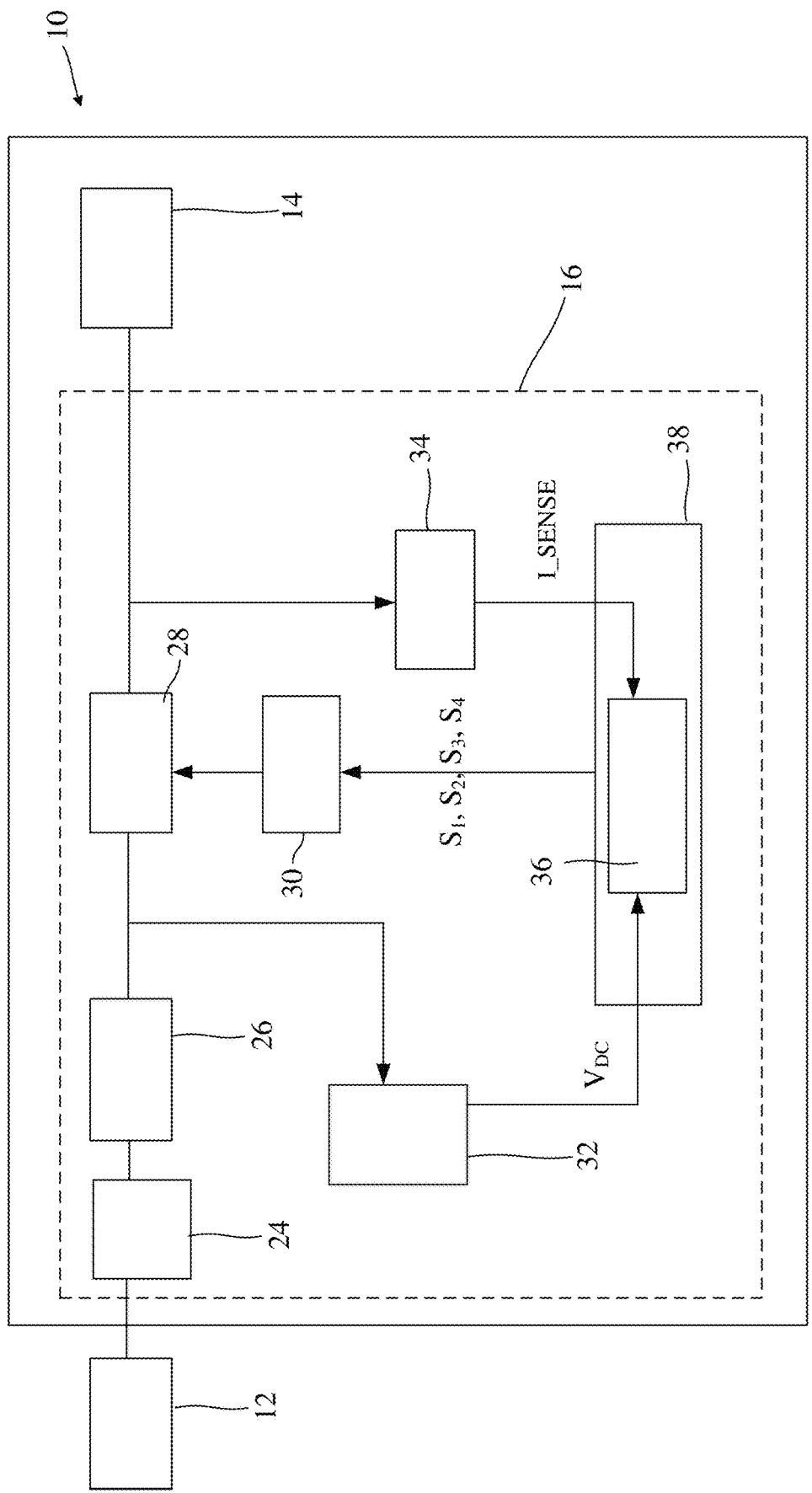
FIG. 1 is a block diagram of a motor system in accordance with the present invention.
Figure 2:
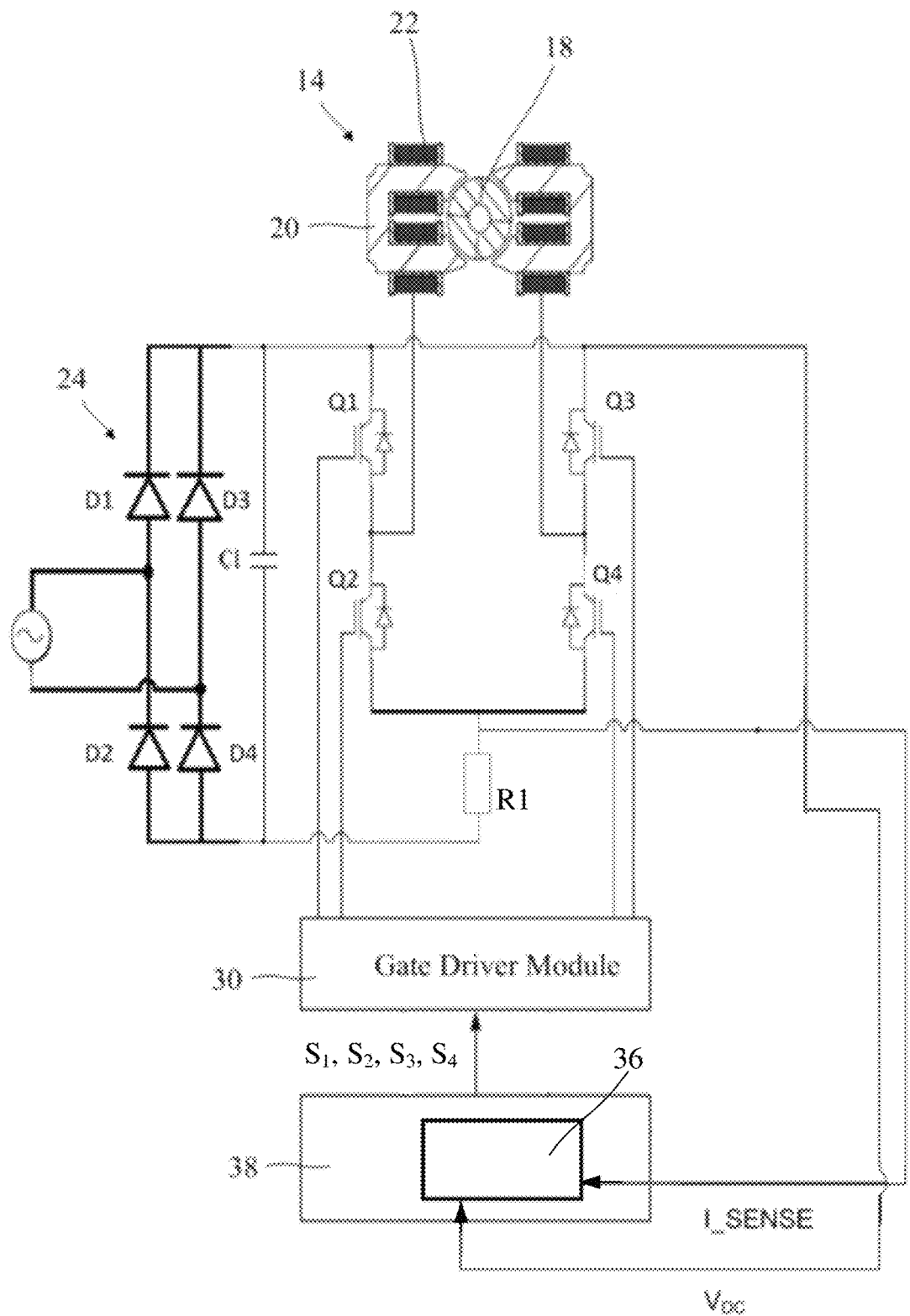
FIG. 2 is a schematic diagram of the motor system of FIG. 1.

The motor system 10 of FIGS. 1 and 2 is powered by an AC mains power supply 12 and comprises a brushless motor 14 and a control system 16. Although the embodiment described here relates to a brushless permanent magnet motor powered by an AC mains power supply 12, it will be appreciated that the teaching herein is also applicable to brushless permanent magnet motors powered by a DC power supply, with appropriate modification which will be immediately apparent to a person skilled in the art The motor 14 comprises a four-pole permanent-magnet rotor 18 that rotates relative to a four-pole stator 20. Conductive wires are wound about the stator 20 and are coupled together (e.g. in series or parallel) to form a single phase winding 22. Although the embodiment described here relates to a single-phase brushless permanent magnet motor 14, it will be appreciated that the teaching herein is also applicable to multi-phase, for example three-phase, brushless permanent magnet motors, with appropriate modification which will be immediately apparent to a person skilled in the art.

The control system 16 comprises a rectifier 24, a DC link filter 26, an inverter 28, a gate driver module 30, a mains power supply voltage sensor 32, a current sensor 34, a back EMF sensor 36, and a controller 38. It will be appreciated by a person skilled in the art that the back EMF sensor 36 here is part of the controller, and may indeed be considered to comprise an algorithm running on the controller 36.

The rectifier 24 is a full-wave bridge D1-D4 that rectifies the output of the AC mains power supply 12 to provide a DC link voltage.

The DC link filter 26 comprises a capacitor C1 that smoothes the relatively high-frequency ripple that arises from switching of the inverter 28.

The inverter 28 comprises a full bridge of four power switches Q1-Q4 that couple the DC link voltage to the phase winding 22. Each of the switches Q1-Q4 includes a freewheel diode.

The gate driver module 30 drives the opening and closing of the switches Q1-Q4 in response to control signals received from the controller 38.

The mains power supply voltage sensor 32 outputs a signal $V_{DC}$ to the controller 38, and also to the back EMF sensor 36, which determines an operating condition of the motor system 10 in steady-state mode, as will be discussed in more detail below The current sensor 34 comprises sense resistor R1 located on a low side of the inverter 28. The voltage across the current sensor 34 is output to the back EMF sensor 36 and the controller 38 as a current sense signal, I_SENSE.

The back EMF sensor 36 generates a digital signal, BEMF, which is used by the controller 38 for determining the signals provided to the gate driver module 30.

The controller 38 comprises a microcontroller having a processor, a memory device, and a plurality of peripherals (for example ADC, comparators, timers etc).

The memory device stores instructions for execution by the processor, as well as control parameters (for example current limit, rise-time threshold, speed threshold, freewheel period, advance period, retard period, energization period, etc) for use by the processor.

The controller 38 is responsible for controlling the operation of the motor 14 and generates four control signals S1-S4 for controlling each of the four power switches Q1-Q4. The control signals are output to the gate driver module 30, which in response drives the opening and closing of the switches Q1-Q4.

FIG. 3 summarizes the allowed states of the switches Q1-Q4 in response to the control signals S1-S4 output by the controller 38. Hereafter, the terms 'set' and 'clear' will be used to indicate that a signal has been pulled logically high and low respectively, or vice versa. As can be seen from FIG. 3, the controller 38 sets S1 and S4, and clears S2 and S3 in order to excite the phase winding 22 from left to right. Conversely, the controller 38 sets S2 and S3, and clears S1 and S4 in order to excite the phase winding 22 from right to left. The controller 38 clears S1 and S3, and sets S2 and S4 in order to freewheel the phase winding 22. Freewheeling enables current in the phase winding 22 to re-circulate around the low-side loop of the inverter 28. In the present embodiment, the power switches Q1-Q4 are capable of conducting in both directions. Accordingly, the controller 38 closes both low-side switches Q2,Q4 during freewheeling such that current flows through the switches Q2,Q4 rather than the less efficient diodes. Conceivably, the inverter 28 may comprise power switches that conduct in a single direction only. In this instance, the controller 38 would clear S1, S2 and S3, and set S4 so as to freewheel the phase winding 22 from left to right. The controller 38 would then clear S1, S3 and S4, and set S2 in order to freewheel the phase winding 22 from right to left. Current in the low-side loop of the inverter 28 then flows down through the closed low-side switch (e.g. Q4) and up through the diode of the open low-side switch (e.g. Q2).

The controller 38 operates in one of three modes depending on the speed of the rotor 18. When the rotor 18 is stationary, the controller 38 operates in start-up mode, which is employed merely to start the rotor 18 moving in a forward direction. Once the rotor 18 is moving forwards, the controller 38 switches to acceleration mode. The controller 38 operates in acceleration mode until the speed of the rotor 18 exceeds a speed threshold, after which the controller 38 switches to steady-state mode. Within each mode of operation, the controller 38 employs a different scheme to control the motor 14 without the need for a dedicated rotor sensor.

Start-Up Mode

The controller 38 makes no attempt to determine the position of the rotor 18 when operating in start-up mode. Instead, the controller 38 excites the phase winding 22 in a predetermined sequence that ensures that, irrespective of the position in which the rotor 18 has parked, the rotor 18 is driven in a forwards direction.

Details of start-up mode are not pertinent to the present invention and will not be described here for the sake of brevity. An appropriate start-up mode may, for example, be the start-up mode described in PCT patent application WO 2013/132249.

Acceleration Mode

When operating in acceleration mode, it is necessary for the controller 38 to know the position of the rotor 18, and so the controller 38 operates a first sensorless scheme for determining the position of the rotor 18. Details of the first sensorless scheme are not pertinent to the present invention and will not be described here for the sake of brevity. An appropriate acceleration mode, and first sensorless control scheme, may, for example, be the acceleration mode and first sensorless control scheme described in PCT patent application WO 2013/132249.

Steady-State Mode

When operating in steady-state mode, the controller 38 employs a second sensorless scheme for determining the position of the rotor 18, and the second sensorless scheme corresponds to a method according to the present invention.

Figure 4:
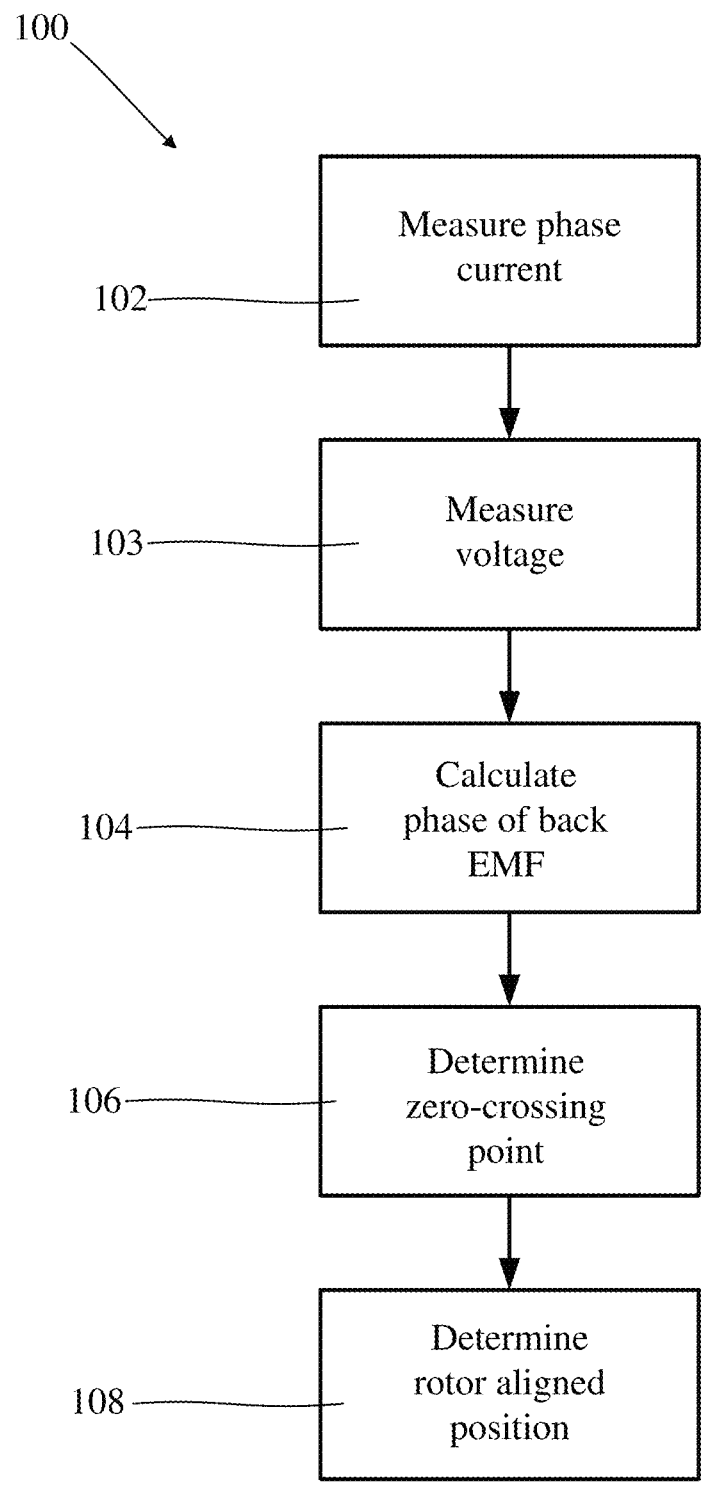
FIG. 4 is a schematic flow chart illustrating a method according to the present invention.

The method according to the present invention, generally designated 100, is shown schematically in FIG. 4.

The method 100 comprises measuring 102 instantaneous phase current flowing through the phase winding 22 during excitation of the phase winding 22, and measuring 103 the average DC voltage applied to the phase winding 22 during excitation of the phase winding 22. A phase of back EMF induced in the phase winding 22 is calculated 104 using the measured instantaneous phase current and the measured average DC voltage. A zero-crossing point of the back EMF induced in the phase winding 22 is determined 106 using the calculated phase of back EMF induced in the phase winding 22. An aligned position of the rotor 18 is determined 108 when the back EMF induced in the phase winding 22 is at the zero-crossing point.

The method 100 makes use of the back EMF sensor 36, and as will now be explained, the back EMF sensor 36 outputs a digital signal, BEMF, which is indicative of zero-crossing points of back EMF.

In the absence of any significant saturation or saliency, the voltage equation for the phase winding 22 may be expressed as:

$$E = L\frac{dI}{dt} + IR - V_{PH},$$

where E is the back EMF induced in the phase winding 22, L is the inductance of the phase winding 22, I is instantaneous phase current flowing through the phase winding 22, R is the resistance of the phase winding 22, and $V_{PH}$ is the voltage across the phase winding 22. The inductance L can further be split into the difference between the self-inductance of the phase winding 22, denoted $L_s$ and the mutual inductance of the phase winding 22, denoted $L_m$.

As can be seen from FIG. 2, and as previously described above, the back EMF sensor 36, ie the controller 38, receives signal $V_{DC}$ from the mains power supply voltage sensor 32, and the signal $V_{DC}$ can be considered to be representative of the phase voltage across the phase winding 22, $V_{PH}$. The back EMF sensor 36 also receives signal I_SENSE from the current sensor 34, which is representative of the instantaneous phase current flowing through the phase winding 22. In view of the nature of the current sensor 34, ie sense resistor R1, the signal I_SENSE is only output to the back EMF sensor 36 and controller 38 during excitation of the phase winding 22, ie when excitation pulses are delivered to the phase winding 22.

Using the inductance, L, and resistance, R, of the phase winding 22, which are known quantities, in combination with the signals $V_{DC}$ and I_SENSE, the back EMF sensor 36 is able to calculate values of instantaneous back EMF using the voltage equation for the phase winding 22 above, when excitation pulses are delivered to the phase winding 22.

It could be the case that a zero-crossing point of back EMF occurs when the phase winding is being excited, and in such a case the calculated values of instantaneous back EMF could conceivably be used to indicate a zero-crossing point of back EMF. In practice, however, the calculated values of instantaneous back EMF are likely to be inaccurate, not least because of the noise of the signal (which may be generated by the differential component of the voltage equation). Furthermore, this does not allow for zero-crossing points of back EMF to be determined with any accuracy where the zero-crossing point occurs when the phase winding is not being excited. It is therefore desirable to provide another method for determining the zero-crossing points of back EMF induced in the phase winding 22, and the inventors of the present application have devised such methods as will now be described.

The first method comprises taking the signals $V_{DC}$ and I_SENSE described above calculate values of instantaneous back EMF using the voltage equation for the phase winding 22 when excitation pulses are delivered to the phase winding 22, as described above. The instantaneous back EMF values are then integrated to remove the noise, and equated to a sinusoidal waveform representative of back EMF induced in the phase winding 22, such that the phase of the back EMF induced in the phase winding 22 can be calculated. The phase can then be used to determine zero-crossings of back EMF induced in the phase winding 22.

These steps are broadly similar to those that will be outlined in relation to the second method below, but crucially here the calculated values of instantaneous back EMF are integrated. Integrating each value of calculated instantaneous back EMF may be computationally intensive, which may lead to the processing power, and hence size and cost, being prohibitive for using this method in practice.

Accordingly, the inventors of the present application have devised a second method, which will now be described, Integrating the back EMF equation gives the relationship shown below:

$$\int_{-a}^{a} E(t)dt = L(I(a) - I(-a)) + R\int_{-a}^{a} I(t)dt - \int_{-a}^{a} V_{DC}(t)dt$$

where −a and a are boundary values at the beginning and end of application of an excitation pulse to the phase winding 22 respectively. This equation can be used to obtain an estimated back EMF integral over the measurement interval, but this estimate needs to be normalized.

The back EMF induced in the phase winding 22 can also be fairly accurately approximated by a sinusoidal waveform having the following equation:

$$E(t) = A \sin(\omega t - \varphi) + \text{noise}(t)$$

where E(t) is the back EMF, A is the amplitude of the back EMF, ω is the angular frequency of the back EMF in radians per second, and φ is the phase of the back EMF in radians. Noise(t) represents any noise present in the back EMF signal.

The integral of the noise component of the back EMF equation approximates to zero, and hence can effectively be ignored.

If we let $F_s$ be the sampling frequency over a measurement interval from −h to h, we let s be the time in samples, and t be the time in seconds, such that $s = F_s t$, then the value bemf_int, calculated from the measured phase current and $V_{DC}$ values, can also be written as the estimated integral of the sinusoidal back EMF waveform on the interval [−h, h] in samples:

$$\text{bemf\_int} = \int_{-h}^{h} E(s)ds = \int_{-h}^{h} A\sin\left(\omega \frac{s}{F_s} - \varphi\right) ds$$

If we substitute $s = (F_s/\omega)x$, then we get:

$$\text{bemf\_int} = \int_{-h\frac{\omega}{F_s}}^{h\frac{\omega}{F_s}} A\sin(x - \varphi)\frac{F_s}{\omega} dx = A\frac{F_s}{\omega} \int_{-h\frac{\omega}{F_s}}^{h\frac{\omega}{F_s}} \sin(x - \varphi) dx$$

It can be seen that a normalization constant for the integral given above is $A \cdot (F_s/\omega)$, where $F_s$ is the sampling frequency. It can also be observed that the integration limit $$h\frac{\omega}{F_s}$$

is half of the measurement interval expressed as the angle of back EMF in radians.

The amplitude, A, depends linearly on the motor speed and is commonly expressed via the motor-specific constant $M_{100K}$, which is the amplitude in volts at the speed of 100,000 RPM. This constant depends on the motor construction, varies slightly with temperature, and can be determined by characterization during a resynchronization phase of the motor 14. The amplitude is thus given by:

$$A = M \cdot 10^3 \frac{f_{RPM}}{10^5} = M \frac{10^3 \cdot 60 \cdot f}{2 \cdot 10^5}$$

where $f_{RPM}$ is the motor speed in RPM.

The normalization constant for the integral of the back EMF therefore becomes:

$$A\frac{F_s}{\omega} = A\frac{F_s}{2\pi f} = M\frac{10^3 \cdot 60 \cdot F_s}{2\pi \cdot 2 \cdot 10^5}$$

The expression $(60 F_s)/(2 \cdot 10^5)$ equals the number of samples per electrical period at 100,000 RPM for a four-pole motor, i.e. at the speed for which the M constant is specified. This can be thought of as the frequency normalization factor, whereas $M \cdot 10^3$ can be thought of as the amplitude normalization factor.

Thus it can be seen from that for known values amplitude and frequency of back EMF, we can calculate the phase of the back EMF induced in the phase winding 22 using the following relationship:

$$\sin\varphi = \frac{A\frac{F_s}{\omega}\int_{-h\frac{\omega}{F_s}}^{h\frac{\omega}{F_s}}\sin(x-\varphi)dx}{2\sin\left(h\frac{\omega}{F_s}\right)}$$

for unit amplitude, and a period of 2 π.

From the integration of the back EMF equation above, we know that:

$$\sin\varphi = \frac{A\frac{F_s}{\omega}\int_{-h\frac{\omega}{F_s}}^{h\frac{\omega}{F_s}}\sin(x-\varphi)dx}{2\sin\left(h\frac{\omega}{F_s}\right)}$$

$$= \frac{L(I(a)-I(-a)) + R\int_{-a}^{a}I(t)dt - \int_{-a}^{a}V_{DC}(t)dt}{2\sin\left(h\frac{\omega}{F_s}\right)}$$

Then by utilizing the values for the measured instantaneous phase current, the measured average voltage applied to the phase winding, and converting the argument of the denominator into radians, we can determine a value for sin φ. The phase, φ, is then obtained by applying the arcsin function.

Figure 5:
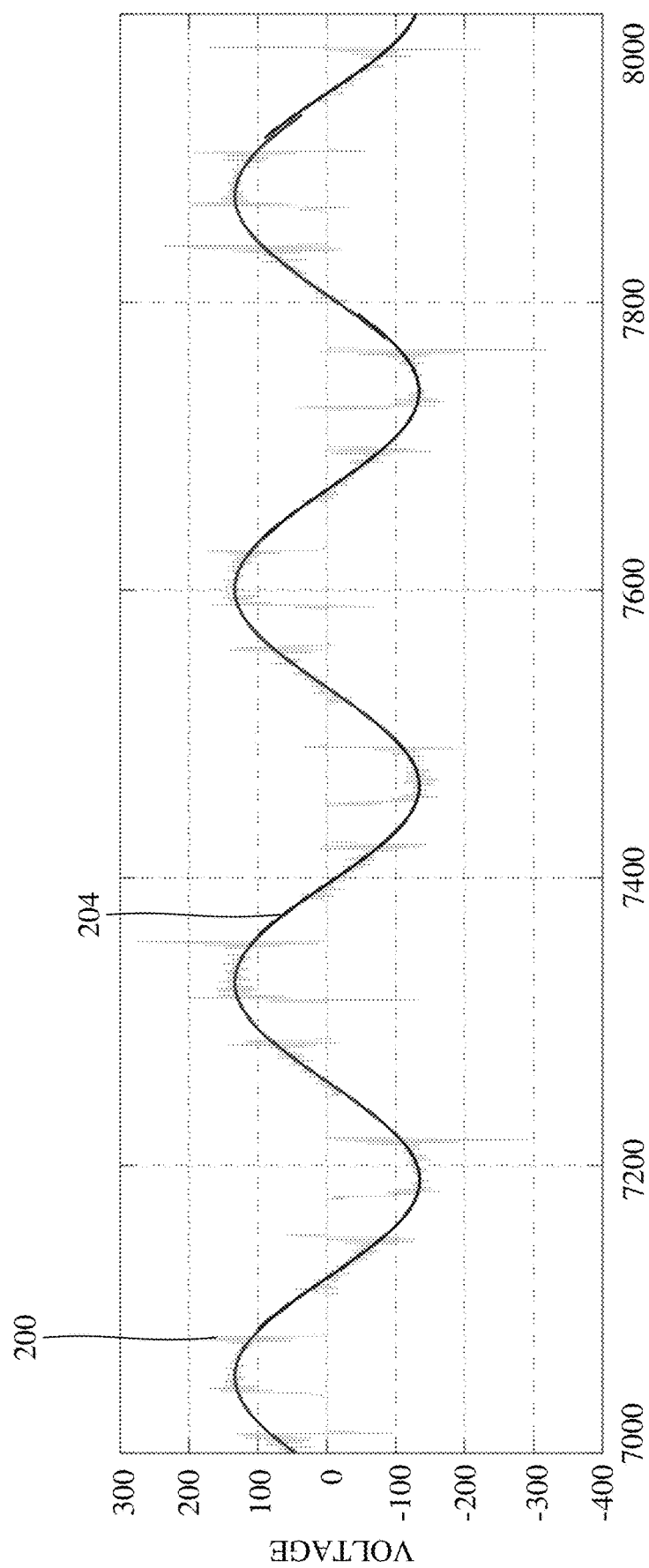
FIG. 5 is a plot of back EMF vs sampling time illustrating part of the method of FIG. 4.

Once the phase has been calculated 104, known amplitude and/or frequency values stored in memory for the given rotor speed, or indeed calculated amplitude and/or frequency values for the given rotor speed, can be used in combination with the phase to determine 106 zero-crossing points of back EMF induced in the phase winding 22, for example using a representation of the back EMF waveform, and An example of such a representation is shown relative to hypothetical calculated values of instantaneous back EMF in FIG. 5. The noisy hypothetical calculated values of instantaneous back EMF are denoted by 200 in FIG. 5, with the fitted curve segments being denoted by 204.

The zero-crossing points of back EMF induced in the phase winding correspond to aligned positions of the rotor 18. Information regarding zero-crossing points of back EMF then used by the controller 38 to commutate the phase winding 22 of the motor 14 in a desired manner, be that advanced commutation relative to the zero-crossing point, synchronous commutation with the zero-crossing point, or retarded commutation relative to the zero-crossing point.

By calculating a phase of back EMF induced in the phase winding 22 using the measured instantaneous phase current and the measured voltage, this information can then be used in conjunction with the known amplitude and frequency to provide a relatively accurate representation of a waveform of the back EMF induced in the phase winding. The representation of a waveform of the back EMF induced in the phase winding may then be used to determine a zero-crossing point of the back EMF induced in the phase winding, and hence to determine an aligned position of the rotor when the back EMF induced in the phase winding is at the zero-crossing point.

The method 100 may enable zero-crossing points to be determined where they lie outside of periods of excitation of the phase winding. In particular, by utilizing a representation of the back EMF induced in the phase winding in the manner described above, zero-crossing points can be determined irrespective of whether or not they lie within a period of excitation of the phase winding. This may enable efficient operation over a wider range of powers relative to, for example an arrangement where the rotor position is determined by hardware. In particular, a motor in which zero-crossing points can only be determined during periods of excitation may have a lower operating efficiency for a given power relative to a motor which is controlled in accordance with the method according to the first aspect of the present invention, as zero-crossing points which lie outside periods of excitation cannot be determined with any accuracy, leading to inefficient commutation.

The method 100 is carried out using software, rather than using hardware. Hence component number and/or overall cost of a control system to implement the method 100 may be reduced, for example relative to a scheme where zero-crossings of back EMF are predicted or calculated using hardware.

The invention claimed is:

1. A method of determining a position of a rotor of a brushless permanent magnet motor, the method comprising:
   measuring instantaneous phase current flowing through a phase winding of the motor during excitation of the phase winding;
   measuring voltage applied to the phase winding of the motor during excitation of the phase winding;
   calculating a phase of back EMF induced in the phase winding using the measured instantaneous phase current and the measured voltage;
   determining, using the calculated phase of back EMF induced in the phase winding, a zero-crossing point of the back EMF induced in the phase winding of the motor; and
   determining, based on when the back EMF induced in the phase winding is at the zero-crossing point, an aligned position of the rotor of the brushless permanent magnet motor.

2. The method as claimed in claim 1, wherein the phase of back EMF induced in the phase winding is calculated using the equation $$E = L\frac{dI}{dt} + IR - V_{PH},$$

where E is the back EMF induced in the phase winding, L is the inductance of the phase winding, I is the phase current flowing through the phase winding, R is the resistance of the phase winding, and VPH is the voltage across the phase winding.

3. The method as claimed in claim 1, wherein the method comprises measuring phase current over a plurality of excitation pulses applied to the phase winding.

4. The method as claimed in claim 3, wherein the method comprises measuring phase current over each excitation pulse applied to the phase winding.

5. The method as claimed in claim 1, wherein measuring current flowing through the phase winding of the motor comprises measuring average phase current flowing through the phase winding of the motor and/or measuring instantaneous phase current flowing through the phase winding of the motor.

6. The method as claimed in claim 1, wherein measuring voltage applied to the phase winding of the motor during excitation of the phase winding comprises measuring average DC voltage and/or measuring instantaneous DC voltage applied to the phase winding of the motor during excitation of the phase winding.

7. The method as claimed in claim 1, wherein the method comprises commutating the phase winding relative to the determined zero-crossing point of back EMF induced in the phase winding.

8. The method as claimed in claim 1, wherein determining a zero-crossing point of the back EMF induced in the phase winding may comprise utilising any or any combination of a calculated phase of back EMF induced in the phase winding, an amplitude representative of the amplitude of back EMF induced in the phase winding, and a frequency representative of the frequency of back EMF induced in the phase winding.

9. The method as claimed in claim 1, wherein calculating a phase of back EMF induced in the phase winding comprises integrating the equation $$E = L\frac{dI}{dt} + IR - V_{PH}$$

to obtain a relationship representative of integrated back EMF.

10. The method as claimed in claim 9, wherein calculating a phase of back EMF induced in the phase winding comprises equating integrated back EMF to an integral of a sinusoidal waveform representative of back EMF induced in the phase winding.

11. The method as claimed in claim 10, wherein calculating a phase of back EMF induced in the phase winding comprises equating a relationship representative of integrated back EMF with an integral of a sinusoidal waveform representative of back EMF induced in the phase winding.

12. The method as claimed in claim 1, wherein calculating a phase of back EMF induced in the phase winding comprises calculating at least one instantaneous back EMF value using the measured instantaneous phase current and the measured voltage.

13. The method as claimed in claim 12, wherein instantaneous back EMF values are calculated using the equation $$E = L\frac{dI}{dt} + IR - V_{PH}.$$

14. The method as claimed in claim 1, wherein calculating a phase of back EMF induced in the phase winding comprises integrating calculated instantaneous back EMF values.

15. A brushless permanent magnet motor, comprising a controller configured to:
measure instantaneous phase current flowing through a phase winding of the motor during excitation of the phase winding;
measure voltage applied to the phase winding of the motor during excitation of the phase winding;
calculate a phase of back EMF induced in the phase winding using the measured instantaneous phase current and the measured voltage;
determine, using the calculated phase of back EMF induced in the phase winding, a zero-crossing point of the back EMF induced in the phase winding of the motor; and
determine, based on when the back EMF induced in the phase winding is at the zero-crossing point, an aligned position of the rotor of the brushless permanent magnet motor.

16. A data carrier comprising machine readable instructions for the operation of a controller of a brushless permanent magnet motor to:
measure instantaneous phase current flowing through a phase winding of the motor during excitation of the phase winding;
measure voltage applied to the phase winding of the motor during excitation of the phase winding;
calculate a phase of back EMF induced in the phase winding using the measured instantaneous phase current and the measured voltage;
determine, using the calculated phase of back EMF induced in the phase winding, a zero-crossing point of the back EMF induced in the phase winding of the motor; and
determine, based on when the back EMF induced in the phase winding is at the zero-crossing point, an aligned position of the rotor of the brushless permanent magnet motor.

17. The method of claim 1, wherein the phase winding is one of a plurality of phase windings of the motor.

18. The method of claim 1, wherein measuring the voltage applied to the phase winding of the motor comprises measuring a direct current voltage applied to the phase winding of the motor.

19. The brushless permanent magnet motor of claim 15, wherein:
the phase winding is one of a plurality of phase windings of the motor; and
the voltage applied to the phase winding is a direct current voltage.

20. The data carrier of claim 16, wherein:
the phase winding is one of a plurality of phase windings of the motor; and
measuring the voltage applied to the phase winding of the motor comprises measuring a direct current voltage applied to the phase winding of the motor.

* * * * *